Patented Oct. 24, 1939

2,177,198

UNITED STATES PATENT OFFICE 2,177,198

FUNGICIDE

Marion C. Goldsworthy, Takoma Park, Md.; dedicated to the free use of the People in the territory of the United States No Drawing. Application September 7, 1938, Serial No. 228,767

1 Claim. (Cl. 167—33)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

My invention relates to the use of phenothiazone as a fungicide in the control of plant diseases. Phenothiazone is a purplish-red crystalline compound melting at 162° C. and is soluble in water to a considerable extent.

The object of my invention is to furnish a material that in no way complicates the usual procedure for the preparation of spray fluids, dusts, or pastes, and one that is reasonable in price and easily manufactured.

A further object of my invention is to provide a new and suitable fungicide that exerts a superior fungicidal efficiency and one that does not in any way injure the plants to be sprayed, dusted or painted.

A further object of my invention is to provide a new fungicide that exerts a superior fungicidal efficiency and one that is not toxic to man or beasts while it remains on the plants or fruit sprayed, dusted, or painted.

My invention exerts a superior fungicidal toxicity and in no way has it proved deleterious to plants sprayed, dusted or painted. It mixes or combines readily with lime, bentonite, talc, fuller's earth, or a combination of any of these to form a mixture to which may be added a spreader, such as soap, sulfonic acids, or casein, or an adhesive, such as natural fats, waxes, synthetic fats or waxes, mineral or vegetable oils, gums, resins, or paints. It mixes readily with lime, bentonite, talc, or fuller's earth to form a fungicidal dust. It readily mixes with oils, paints, gums, resins, and colloidal clays to form a fungicidal paste for painting open wounds of plants. My invention is readily absorbed on wrapping tissue to form a product suitable for fungicidal protection of stored fruits. My invention is also useful as an ingredient of washing treatments of fruits. My invention may be used as a seed or soil disinfectant, either as a liquid or as a powder.

My invention has repeatedly proved toxic in very dilute concentrations to the spores of the organisms causing brown rot of apples, peaches and other stone fruits, and apple bitter rot in laboratoary tests, and field tests have proved its value in controlling peach brown rot and apple scab.

While I prefer to use the pure chemical known as phenothiazone in sprays, dusts, paints, fruit wraps, and seed, soil, or fruit disinfectants, I am not restricted entirely to this compound as a source of phenothiazone. I do not overlook the fact that phenothiazone may be a product which may result from an oxidation in the presence of light and air on other organic compounds, and I may therefore prefer to use, as a source of phenothiazone, any material that gives, as a product of an oxidation reaction with air and light, phenothiazone. As examples of such materials, I may prefer to use such a compound known as phenothiazine or such a compound known as phenothiazine sulfoxide, which, when oxidized in the presence of air and light, yield the substance phenothiazone.

I prefer to use a material such as phenothiazine or phenothiazine sulfoxide, which is not stabilized against oxidation. Pure phenothiazine or phenothiazine sulfoxide is preferred for this purpose. Stabilized phenothiazine or phenothiazine sulfoxide is prevented from changing to phenothiazone and is therefore not useful as a source of my invention.

I have repeatedly observed that the production of phenothiazone from pure or unstabilized phenothiazine and phenothiazine sulfoxide proceeds rapidly under the influence of air and light.

I have observed repeatedly that pure unstabilized phenothiazine and phenothiazine sulfoxide do not exert a fungicidal property when kept in the dark.

I have observed repeatedly that pure unstabilized phenothiazine and phenothiazine sulfoxide when exposed to air and light quickly display a fungicidal property and that this property is due to the formation of a new compound, namely, phenothiazone.

I have observed that when phenothiazine is placed in contact with water in the dark, a clear solution results which has no fungicidal activity. If such a system is exposed directly to light in the presence of air, the solution of the phenothiazine in water becomes in a short time purplish in color. As the purple color forms, due to the formation of phenothiazone, the solution becomes toxic to the spores of fungi directly in proportion to the depth of the color.

I have observed that when phenothiazone is combined with lime and bentonite in the proportions of 4 grams of phenothiazone, 906 grams of hydrated lime or 453 grams of bentonite, or both, and added to 50 gallons of water, a spray compound is formed which is toxic to the spores of the peach brown-rot organism and the apple bitter-rot organism.

While I have repeatedly observed that the above concentration of phenothiazone in the proportion of 4 grams of phenothiazone, 906 grams of hydrated lime, or 453 grams of bentonite, or both, is toxic to the spores of the peach brown-rot and the apple bitter-rot fungi, I am not restricted in its application to plants to such a concentration but may use any amount of phenothiazone, hydrated lime, bentonite, or both, to 50 gallons of water.

I have repeatedly observed that phenothiazine or phenothiazine sulfoxide combined with lime or bentonite, or both, in the proportions of 453 grams of phenothiazine or phenothiazine sulfoxide, 906 grams of hydrated lime, and 453 grams of bentonite, forms a spray compound when added to 50 gallons of water, which is not toxic to the spores of the peach brown-rot and apple bitter-rot organisms when not exposed to air and light.

I have repeatedly observed that phenothiazine or phenothiazine sulfoxide combined with lime or bentonite, or both, in the proportions of 453 grams of phenothiazine or phenothiazine sulfoxide, 906 grams of hydrated lime, and 453 grams of bentonite, forms a spray compound when added to 50 gallons of water which is toxic to the spores of the peach brown-rot and apple bitter-rot organisms only when exposed to air and light.

While I have repeatedly observed that the proportion of 453 grams of phenothiazine or phenothiazine sulfoxide, 906 grams of hydrated lime, 453 grams of bentonite, or both, is suitable as a source of my invention when oxidized in the presence of air and light, I am in no way restricted as to the proportions that I may use of these materials to arrive at the end product, namely, phenothiazone.

I have repeatedly observed that such a combination of phenothiazine or phenothiazine sulfoxide, lime, or bentonite, or both, becomes of a purplish color when exposed to air and light, and that the purple color is due to the formation of a new compound, namely, phenothiazone.

I have repeatedly observed that such a combination of phenothiazine or phenothiazine sulfoxide, lime, or bentonite, or both, when exposed to air and light with the resultant formation of the new compound, namely, phenothiazone, becomes toxic to the spores of the peach brown-rot and apple bitter-rot organisms directly in proportion to the amount of phenothiazone produced.

I have repeatedly observed that a solution of phenothiazone at the concentration of 5 parts of phenothiazone per million parts of water exerts a complete fungicidal effect upon the spores of the peach brown-rot and apple bitter-rot organisms when administered in a dynamic system.

Having thus described my invention, what I claim for Letters Patent is:

A fungicide containing as its essential active ingredient phenothiazone.

MARION C. GOLDSWORTHY.